3,317,514
METHOD OF PRODUCING HIGH VISCOSITY STARCH PHOSPHATE PRODUCTS CONTINUOUSLY
George W. Fox, Jr., and Arden R. Weatherly, Chicago, Ill., assignors to American Maize-Products Company, a corporation of Maine
Filed Dec. 13, 1963, Ser. No. 330,373
11 Claims. (Cl. 260—233.5)

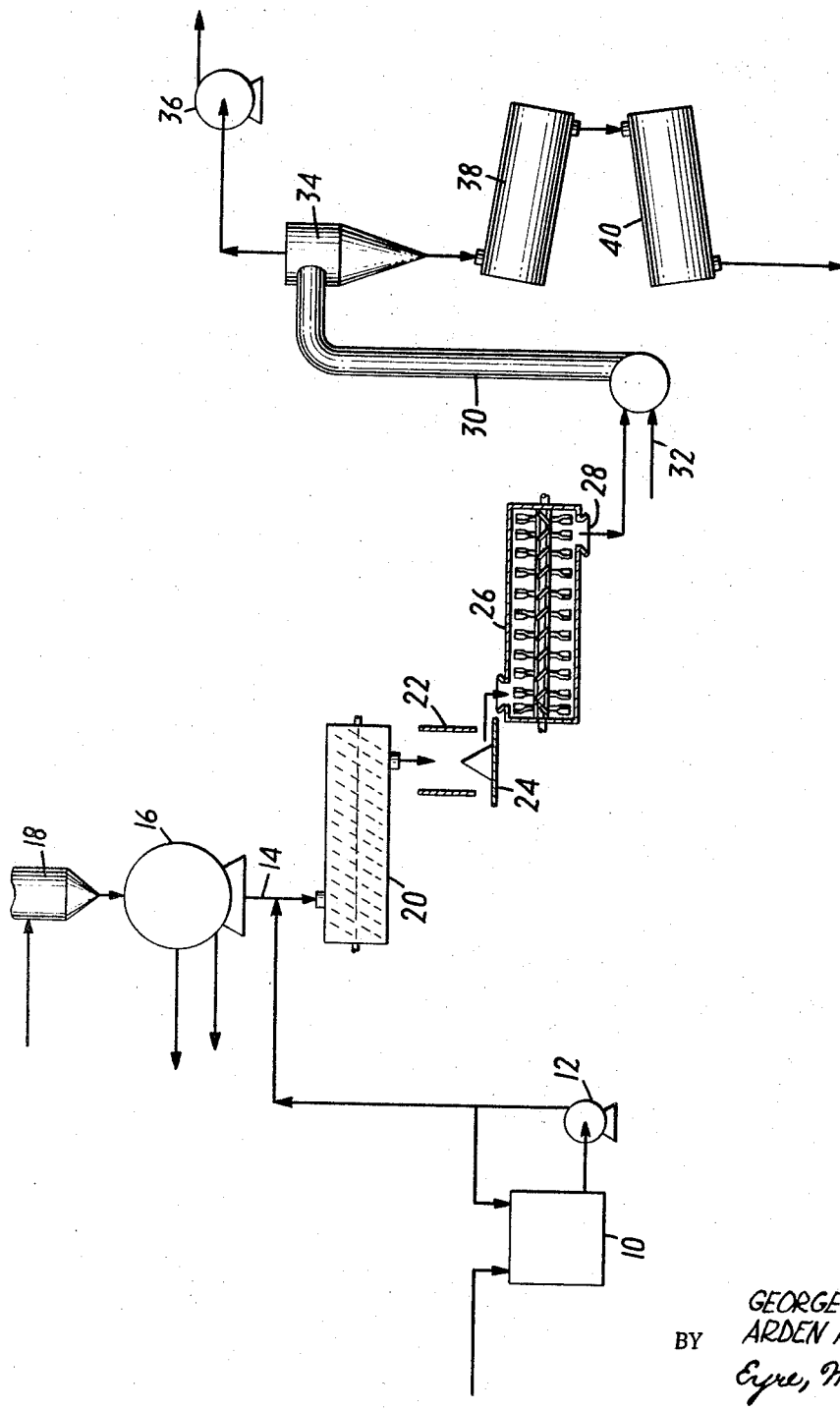

This invention relates to a method of producing starch phosphates, comprising the heat reaction product of starch granules and alkali metal phosphate salts, on a continuous basis.

In U.S. Patent No. 2,884,412 and others, the preparation of new forms of reaction products of starch and alkali metal phosphate is described. These so-called Neukom starch phosphates are made generally by impregnating starch granules with aqueous solutions of alkali metal phosphates and then roasting the granules at elevated temperatures in the absence of excess, unabsorbed water to bring about reaction between the starch and phosphate salt. Although there are indications that some form of esterification takes place, this reaction proceeds in a manner not well understood to yield granular starch phosphate products having extremely useful properties as thickeners, stabilizers, binders and viscosity-control agents. Outstanding among such properties is the high viscosity that can be obtained with dilute aqueous solutions of the products, thereby providing a desirably low solids-to-viscosity ratio in end use applications. For example, 5% aqueous solutions of Neukom starch phosphates prepared by prior art methods may have room temperature viscosities on the order of 30,000 cps.

We have now discovered a new method of reacting starch and alkali metal phosphates which yields products far superior to the conventional Neukom starch phosphates and which is susceptible of such accurate and uniform control as to permit carrying out the method continuously to achieve reliable and consistent results. More specifically, we have found that if starch granules with added alkali metal phosphate salts are subjected to a preconditioning step, involving heat and agitation under prescribed conditions, then subsequent reactions between the starch and phosphate salt, during roasting, are so materially altered or modified that entirely new products are obtained as evidenced by the solution viscosities and bound phosphate contents thereof.

For example, as previously mentioned, the viscosity of 5% aqueous solutions of conventional Neukom starch phosphates is generally about 30,000 cps. In contrast, corresponding solutions of starch phosphate products prepared in accordance with our new method exhibit viscosities on the order of 100,000 cps. This remarkable difference can be attributed directly to the novel preconditioning step of our process which in other respects does not differ appreciably from the conventional processes.

Additional evidence of the new form of reaction which is brought about in our process may be found in the bound phosphate contents of the final products. Theoretical considerations indicate that 8% by weight is the maximum bound phosphate that can be introduced in the Neukom starch phosphate materials. We have made considerable studies of the conventional processes which are disclosed by Neukom and others for making these materials and we found that it was not possible to introduce more than 3% by weight of bound phosphate with such processes, in many cases the phosphate contents actually being appreciably less than this apparent maximum. With the preconditioning step of our new method, however, we achieve final products containing as much as 4.7% by weight of bound phosphate and this again is directly attributable to the preconditioning step which was lacking in the conventional processes.

It was entirely surprising and unexpected that a preliminary treatment of starch granules containing alkali metal phosphate salt, in the manner of our preconditioning step, could so markedly change the characteristics of the final starch phosphate products. This preconditioning step, which consists of subjecting the starch granules to heat and agitation while critical proportions of the three essential ingredients starch, phosphate salt and water are maintained, apparently increases the penetrability of the starch granules by the phosphate salt since so much more of the salt becomes chemically bound up in the final product. In physical characteristics, the starch granules become swollen but not broken during the preconditioning step and this change, coupled with the influences of heat, agitation and balanced relative proportions of ingredients, apparently makes the starch granules far more receptive to the phosphate salt. By simple analogy, the starch granules appear to open up like the blooming of flowers in sunlight, whereby avenues of penetration into the interior of the granules are expanded and enlarged. Aside from these presently-favored views based on the facts at hand, we are unable to account for the drastic effects of the preconditioning step in our process, but we have definitely ascertained its criticality in producing the superior starch phosphates of our invention.

One of the great advantages of our discovery is that the essential preconditioning step can be so closely controlled as to permit a continuous process which gives reliable and consistent results. For example, both the application of heat to achieve certain temperatures during preconditioning and the requirement for agitation are matters which can be easily controlled automatically, if desired from a remote process control center. Likewise, the maintenance of certain relative proportions of ingredients during preconditioning is easily accomplished, so that our process is well suited for continuous production of starch phosphates. This is of major importance commercially and constitutes an advance in the art not heretofore feasible.

Briefly characterized, our process comprises mixing with ungelatinized starch granules from about 20 to 80% and preferably from about 30 to 45% of water, and from about 5 to 12% and preferably from about 8 to 10% of alkali metal phosphate salt, preconditioning the starch granules by raising the temperature of the mixture to within the range from about 110° to 190° F. and simultaneously agitating the mixture while the defined proportions of ingredients are maintained, then reducing the moisture content of the starch granules to below 20% by weight and roasting the granules at temperatures within the range from about 290° to 400° F. to react the starch and phosphate salt, all proportions being expressed on the weight of starch granules. As previously noted, the essence of the invention is the discovery that the preconditioning step above described peculiarly adapts the starch granules for a reaction with the alkali metal phosphate salt at elevated temperatures and in the absence of excess unabsorbed water.

In carrying out the process, various techniques may be employed to form the initial mixture required before the preconditioning of the starch granules. This mixture consists of the three essential ingredients starch, water and alkali metal phosphate salt wherein there is present from about 20 to about 80% of water based on the weight of starch and from about 5 to about 12% of alkali metal phosphate salt based on the weight of starch. The mixture may be formed by adding each of the components as separate ingredients to a vessel in the defined proportions such as by the use of dry starch granules, dry phosphate salt and the required amount of water. However, this is the least convenient or advantageous method of bringing the three ingredients together in commercial operations, since it is envisaged that the process will be carried out in a starch production plant wherein the starch granules can be obtained from the main slurry stream representing the output of the plant. Accordingly, we prefer to use wet starch cake diverted from the main stream of a starch production plant as the source of starch granules for use in the mixture. It is, of course, necessary that these granules not be pasted or gelatinized for use in the process.

The required amount of water in the mixture may be supplied in part by the wet starch cake that is diverted from the main product stream. Any additional water which may be required can be added separately or supplied by addition of alkali metal phosphate salts in the form of aqueous solutions.

As regards the phosphate salt, any alkali metal phosphate customarily employed in making the Neukom starch phosphates may be used. For example, mono- di- and tri-soduim phosphate salts are economical and may be used singly or in combinations, and preferably the mixture of salts will give a neutral pH in the aqueous mixture containing the starch granules. In particular, the combination of a mono-sodium phosphate and a di-sodium phosphate has been used with excellent results and these are preferred. The phosphate salts are conveniently supplied in the form of an aqueous solution containing about 50% by weight of solids. Such solutions can be held in storage tanks as a continuous source of supply to be dispensed in metered quantities to the process equipment.

As previously noted, the preferred proportions of ingredients in the aqueous mixture of starch, phosphate salt and water are from about 30 to about 45% of water and from 8 to about 10% of alkali metal phosphate salt.

The starch granules in the aqueous mixture are next preconditioned in accordance with the invention. This requires that the aqueous mixture containing the granules and the phosphate salt be both heated and agitated while the proportions of each ingredient are within the ranges previously stated. The temperature of preconditioning may be within the range from 110° to about 190° F. The heat required can be supplied in any convenient manner, for example, by circulating heat mediums in the packet of the vessel in which the mixture is to be preconditioned. In addition, part of the heat required can be supplied by means of the phosphate solution which is used to make up the mixture. In other words, the phosphate solution may be heated to temperatures of 140 to 150° F. before the solution is added in metered quantities to the starch granules and/or water. This not only helps to reduce the heat input in the preconditioning vessel, but also permits the use of concentrated phosphate salt solutions which will remain as true solutions without precipitation of the phosphate salt because of the elevated temperature. Finally, the heat required during preconditioning may also be generated in part by the friction of, for example, vigorous mechanical agitation.

As for agitating, the preconditioning vessel may be equipped with any mechanical form of agitator to agitate the aqueous mixture of starch and phosphate salt in the manner required. We have achieved excellent results with an apparatus consisting of a horizontally-oriented cylindrical tube containing a rotor along the center axis, the rotor having a plurality of arms extending radially outward from the rotor which can be rotated very rapidly within the cylindrical outer tube. As the heated aqueous mixture of starch phosphate salt and water is passed through this apparatus, the rapidly rotating radial arms subject the mixture to a vigorous mechanical whipping action which is effective in causing the granules to open up and receive the phosphate salt. Other forms of agitation, such as sonic vibrations, oscillating belts or tables or tumbling equipment may be employed.

The time of preconditioning is not of critical importance. Specifically, we have found that even if the aqueous mixture of starch phosphate salt and water is preconditioned with heat and agitation for only a matter of seconds, the improved results in the final products will be obtained. On the other hand, the preconditioning period may be extended for up to four hours or more, although this does not give significantly greater benefits and ordinarily would slow down the process. Apparently it is more the fact of the aqueous mixture being subjected to the conditions of the preconditioning step which is critical rather than the duration of the treatment.

Following the preconditioning step, the aqueous mixture is converted to a semi dry mass of starch granules, now containing alkali phosphate salt, by removing excess unabsorbed water. This may be done most conveniently with simple evaporation and the moisture content should be reduced to below 20% by weight based on the weight of the starch preferably in a rapid manner. For this purpose, various flash dryers using heated air and other forms of conventional drying apparatus may be used.

When the moisture content of the starch granules has been adjusted to below 20% by weight, the starch granules are then heated to elevated temperature for reaction with the phosphate salt at reaction temperatures within the range from about 290 to 400° F. For this phase of the process, we have achieved excellent results with a rotating heated drum in which the starch granules can be quickly elevated to and roasted at the reaction temperature mentioned. The period of reaction of the elevated temperature may range from about one-half hour to about four hours, and following completion of the reaction the resulting starch phosphate product is cooled to room temperature. As previously mentioned, these starch phosphate products contain unprecedented amounts of phosphate, as much as 4.7% by weight, and they are capable of providing extremely high viscosities in dilute concentrations in aqueous solutions. The products have many uses in industrial applications, such as adhesives, paper and textile finishes, film formation and in food applications as thickners and stabilizers as well. Further details of our invention will be understood by reference to the accompanying drawing, which is a schematic diagram of a process to be carried out in accordance with the invention continuously.

Referring to the diagram, 10 indicates a storage tank in which an aqueous solution of phosphate salt may be held in a heated condition at temperatures of 140 to 150° F. This solution is dispensed in metered quantities by means of the pump 12 into the line 14 leading from the dewatering device 16 and the head tank 18.

The head tank 18 receives starch slurry of, for example, 20–30° Baumé from the main stream of a starch production plant. The starch slurry is dewatered in the device 16 in conventional manner, and as the wet starch granules are discharged through line 14, they are mixed with the phosphate solution supplied by the pump 12. The aqueous mixture of starch granules, phosphate salt and water is then moved through the blender 20 where it undergoes gentle mixing in order to form a uniform mixture. The mixture is dropped from the blender 20 into the wet cake feeder 22, which includes the rotating table 24 for discharging the mixture into the jacketed agitation apparatus 26, previously described hereinabove.

In this apparatus a heating medium is circulated through the outer jacket to raise the temperature of the starch phosphate salt water mixture therein, as may be required, to from about 110° to 190° F. The rotor with radial arms located along the central axis of the apparatus 26 subjects the mixture to vigorous mechanical agitation as the mixture travels through the apparatus towards the discharge end 28. During this treatment, the starch granules are preconditioned and become more receptive to the penetration of phosphate salt.

The mixture is then discharged from the preconditioning apparatus 26 into the flash dryer tube 30 which includes the inlet 32 for hot air. The moisture content of the starch granules is reduced in the starch dryer 30 to below 20% by weight and the semi-dry granules are passed into the cyclone separator 34 where dust or small broken fragments of the granules are removed through the overhead exhaust blower 36. The remaining starch granules are then dropped into the roasting apparatus 38 which consists of a rotating drum with a jacket for circulation of a heating medium. In the roaster 38 the starch granules are raised in temperature to within the range of 290 to 400° F. and reaction proceeds between the starch and the phosphate salt contained therein. When reaction has been completed, the product is discharged into the cooling apparatus 40 which is very similar to the roaster 38 except that a cooling medium is circulated through the jacket of the latter. The cooled finished starch phosphate product is discharged from the cooling apparatus 40 for collection in any suitable vessel.

The foregoing process has been operated extensively in experimental runs and the results have consistently shown that the preconditioning step carried out in the apparatus 26 is the vital factor for achieving superior starch phosphate products on a continuous basis. Without preconditioning, the products not only have less valuable properties but the results tend to be erratic as well. By preconditioning the aqueous mixture of starch granules and alkali metal phosphate salt with heat and vigorous agitation, we are able to avoid such problems and continuously produce starch-phosphate salt reaction products which possess physical properties of unprecedented commercial value and utility.

It will be understood that it is intended to cover all changes and modifications of the preferred embodiments of the invention herein chosen for the purpose of illustration which do no constitute departures from the spirit and scope of the invention.

We claim:

1. A process for producing starch phosphates which comprises forming a mixture of ungelatinized starch granules, from about 5% to about 12% by weight of at least one alkali metal phosphate salt based on the weight of said granules and from about 20% to about 80% by weight of water based on the weight of said granules, vigorously agitating said mixture and heating it to temperatures within the range from about 110° to about 190° F. to precondition said granules to enhanced penetration by and reaction with said phosphate salt, reducing the water content of said granules to below 20% by weight thereof and then roasting said granules at temperatures within the range from about 290° F. to about 400° F. to bring about reaction with said phosphate salt.

2. A process as in claim 1 wherein the duration of the preconditioning step is from a few seconds up to about 4 hours.

3. A process as in claim 1 wherein reaction between said granules and phosphate salt is completed after about one half hour to about four hours of roasting.

4. A process as in claim 1 wherein said mixture of starch granules, phosphate salt and water is blended homogeneously prior to the preconditioning step.

5. A process as in claim 1 wherein said phosphate salt is mixed with said granules in the form of an aqueous solution containing 50% by weight of said salt.

6. A process as in claim 5 wherein said aqueous solution is heated up to about 150° F. before being mixed with said granules.

7. A process as in claim 1 which includes the step of separating dust and broken starch granule fragments from said granules prior to the roasting thereof.

8. A process as in claim 1 wherein said phosphate salt is a combination of mono-sodium and di-sodium phosphates.

9. A process as in claim 1 which includes the added step of cooling said granules to room temperature following completion of the reaction with said phosphate salt.

10. A process as in claim 1 wherein the recited steps are carried out continuously.

11. A process for producing starch phosphates which comprises forming a mixture of ungelatinized starch granules, from about 8% to about 10% by weight of at least one alkali metal phosphate salt based on the weight of said granules and from about 30% to about 45% by weight of water based on the weight of said granules, vigorously agitating said mixture and heating it to temperatures within the range from about 110° to about 190° F. to precondition said granules to enhanced penetration by and reaction with said phosphate salt, rapidly reducing the water content of said granules to below 20% by weight thereof and then roasting said granules at temperatures within the range from about 290° to about 400° F. for about one half hour to about four hours to bring about reaction with said phosphate salt.

References Cited by the Examiner

UNITED STATES PATENTS 2,865,762 12/1958 Neukom _____ 99—139
3,060,170 10/1962 Sietsema et al. _____ 260—233.5

LEON J. BERCOVITZ, *Primary Examiner.*

R. W. MULCAHY, *Assistant Examiner.*